(12) United States Patent
Kim et al.

(10) Patent No.: US 12,341,162 B2
(45) Date of Patent: Jun. 24, 2025

(54) CAPSULE FOR LITHIUM-SULFUR SECONDARY BATTERY, AND LITHIUM-SULFUR SECONDARY BATTERY COMPRISING SAME

(71) Applicant: LG Energy Solution, Ltd., Seoul (KR)

(72) Inventors: Kihyun Kim, Daejeon (KR); Sangryeo Lee, Daejeon (KR); Lucia Kim, Daejeon (KR); Dong Hyeop Han, Daejeon (KR); Jee Seon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 491 days.

(21) Appl. No.: 17/925,578

(22) PCT Filed: Sep. 7, 2021

(86) PCT No.: PCT/KR2021/012110
§ 371 (c)(1),
(2) Date: Nov. 15, 2022

(87) PCT Pub. No.: WO2022/055217
PCT Pub. Date: Mar. 17, 2022

(65) Prior Publication Data
US 2023/0344018 A1 Oct. 26, 2023

(30) Foreign Application Priority Data

Sep. 10, 2020 (KR) .................. 10-2020-0116127

(51) Int. Cl.
*H01M 10/42* (2006.01)
*B01J 13/16* (2006.01)
*H01M 10/052* (2010.01)
*H01M 10/0567* (2010.01)

(52) U.S. Cl.
CPC ......... *H01M 10/4235* (2013.01); *B01J 13/16* (2013.01); *H01M 10/052* (2013.01); *H01M 10/0567* (2013.01); *H01M 2300/0025* (2013.01)

(58) Field of Classification Search
CPC .......... H01M 10/4235; H01M 10/052; H01M 10/0567; H01M 4/382; H01M 10/0525; H01M 4/136; H01M 4/5815; B01K 13/16; Y02E 60/10
See application file for complete search history.

(56) References Cited

U.S. PATENT DOCUMENTS

| | | | |
|---|---|---|---|
| 2005/0288433 A1* | 12/2005 | Chen ................... | C08J 3/18 525/50 |
| 2006/0128835 A1 | 6/2006 | Usui et al. | |
| 2007/0015048 A1 | 1/2007 | Lee et al. | |
| 2010/0320421 A1* | 12/2010 | Calle ................... | C09B 67/0097 252/388 |
| 2013/0143076 A1 | 6/2013 | Sachdev et al. | |
| 2014/0120402 A1* | 5/2014 | Yu ..................... | H01M 50/446 429/144 |
| 2015/0093635 A1 | 4/2015 | Grimminger et al. | |
| 2016/0066568 A1 | 3/2016 | Lu et al. | |
| 2018/0282230 A1 | 10/2018 | Oh et al. | |
| 2019/0322538 A1 | 10/2019 | Liu et al. | |
| 2020/0350570 A1 | 11/2020 | Kim et al. | |
| 2022/0294002 A1 | 9/2022 | Kim et al. | |

FOREIGN PATENT DOCUMENTS

| | | |
|---|---|---|
| CN | 105140449 A | 12/2015 |
| CN | 111193017 A | 5/2020 |
| JP | 2009501419 | 1/2009 |
| JP | 6279241 B2 | 2/2018 |
| JP | 2022544975 | 10/2022 |
| KR | 10-2007-0008405 A | 1/2007 |
| KR | 10-0809799 B1 | 3/2008 |
| KR | 10-2008-0037213 A | 4/2008 |
| KR | 10-1040861 B1 | 6/2011 |
| KR | 10-1156964 B1 | 6/2012 |
| KR | 10-2016-0010460 A | 1/2016 |
| KR | 10-2017-0097578 A | 8/2017 |
| KR | 10-2019-0056121 A | 5/2019 |
| KR | 10-2019-0062760 A | 6/2019 |
| KR | 10-1990616 B1 | 6/2019 |
| KR | 10-2019-0077884 A | 7/2019 |

OTHER PUBLICATIONS

Widmann ("Encapsulation of Levitated Microspheres", Journal of Colloid and Interface Science, vol. 188, No. 2, Mar. 1, 1998, p. 197-205) (Year: 1998).*

Tae-Wook Lim et al., "Time Release of Encapsulated Additives for Enhanced Performance of Lithium-Ion Batteries", ACS Appl. Mater. Interfaces (2017) 9, 46, 40244-40251.

Yayuan Liu et al., "Solubility-mediated sustained release enabling nitrate additive in carbonate electrolytes for stable 2 lithium metal anode", Nature communications, (2018) 9, Article No. 3656 (2018).

* cited by examiner

*Primary Examiner* — Adam A Arciero

(74) *Attorney, Agent, or Firm* — Bryan Cave Leighton Paisner LLP (57) ABSTRACT

A capsule for a lithium-sulfur secondary battery, the capsule comprising a core containing a material capable of forming and restoring a solid electrolyte interface layer and a hydrogel; and a shell formed of a polymer and surrounding the core, is provided. The capsule maintains the solid electrolyte interface layer on a negative electrode for a long time by maintaining the material capable of forming and restoring the solid electrolyte interface layer at a constant level during operation of the lithium-sulfur secondary battery.

14 Claims, 3 Drawing Sheets

CAPSULE FOR LITHIUM-SULFUR SECONDARY BATTERY, AND LITHIUM-SULFUR SECONDARY BATTERY COMPRISING SAME

CROSS-REFERENCE TO RELATED APPLICATION

The present application is a National Stage Application of International Application No. PCT/KR2021/012110, filed on Sep. 7, 2021, which claims the benefit of priority based on Korean Patent Application No. 10-2020-0116127 filed on Sep. 10, 2020, the disclosures of which are incorporated herein by reference in their entireties.

FIELD OF DISCLOSURE

The present disclosure relates to a capsule for a lithium-sulfur secondary battery.

BACKGROUND

Recently, as the miniaturization, weight reduction and high performance of electronic devices and communication devices are rapidly progressing and the need for electric vehicles has been greatly increased in relation to environmental problems, there is a growing demand for performance improvements in secondary batteries used as energy sources for these products. For a secondary battery to satisfy these requirements, a lot of research on a lithium-sulfur battery using sulfur-based materials as a positive electrode active material is being conducted.

The lithium-sulfur battery is a secondary battery that uses, as a positive electrode active material, sulfur-based compounds containing sulfur-sulfur bonds and uses, as a negative electrode active material, an alkali metal such as lithium or a carbon-based material in which intercalation/deintercalation of metal ions such as lithium ions occur.

In particular, the theoretical discharging capacity of the lithium-sulfur battery is 1,675 mAh/g, and the theoretical energy density is 2,600 Wh/kg, which is about 5 times higher than that of the lithium-ion battery currently being studied (about 570 Wh/kg). Accordingly, the lithium-sulfur battery is a battery that can realize high capacity, high energy density and long lifetime. In addition, since sulfur, which is the main material of the positive electrode active material, has a low atomic weight, is very rich in resources and thus easy to supply and receive, and is cheap, non-toxic and environmentally friendly, the lithium-sulfur battery is attracting attention as an energy source for medium to large-sized devices such as electric vehicles as well as portable electronic devices.

This lithium-sulfur secondary battery uses lithium metal as a negative electrode, and thus in order to protect the lithium metal negative electrode, an additive is added to the electrolyte solution, and accordingly, a solid electrolyte interface (SEI) layer is formed by the reaction of the additive with the lithium metal. However, in such a lithium-sulfur secondary battery, when charging and discharging are repeated, the solid electrolyte interface (SEI) layer on the negative electrode is damaged, and lithium metal is exposed, and as a result, the efficiency of the battery is sharply reduced, and the discharging capacity is lowered, leading to deterioration of the battery.

In order to prevent such damage to the solid electrolyte interface (SEI) layer of the negative electrode, if the content of a material (additive) that can simply form and recover the solid electrolyte interface (SEI) layer as a component of the battery is increased, the additive may act as a resistor in the battery, and thus cause a decrease in energy density and a shortened lifetime.

Therefore, in order to prevent damage to the solid electrolyte interface layer and maintain a constant level of the solid electrolyte interface (SEI) layer, there is a need for a method to maintain the content of a material, which is capable of forming and recovering the solid electrolyte interface (SEI) layer even during operation of the lithium-sulfur secondary battery, at a constant level.

RELATED ART

Korean Laid-open Patent Publication No. 10-2007-0008405 (Jan. 17, 2007), "Lithium Secondary Battery Containing Capsule for Controlled-release of Additives"

SUMMARY

Therefore, in the present disclosure, it was found that with regard to a negative electrode of a lithium-sulfur secondary battery, when a capsule comprising a core containing a hydrogel and a material capable of forming and restoring a solid electrolyte interface (SEI) layer, and a shell formed of a polymer and surrounding the core is used as an additive for the lithium-sulfur secondary battery to maintain a constant level of a material (additive) that can react with lithium metal to form and restore the solid electrolyte interface (SEI) layer on the negative electrode even during operation of the lithium-sulfur secondary battery, it is possible to suppress the abrupt decrease in the efficiency of the battery and the decrease in the discharging capacity by preventing damage to the solid electrolyte interface (SEI) layer on the negative electrode even during operation of the lithium-sulfur secondary battery and thus preventing the lithium metal from being exposed to the electrolyte solution, and thus the present disclosure has been completed.

Therefore, it is an object of the present disclosure to provide a capsule for a lithium-sulfur secondary battery, which can prevent damage to the solid electrolyte interface (SEI) layer formed on the negative electrode of the lithium-sulfur secondary battery, thereby improving the lifetime characteristics of the lithium-sulfur secondary battery, and a method for preparing the same. In particular, it is an object of the present disclosure to provide a capsule for a lithium-sulfur secondary battery, which can maintain a solid electrolyte interface (SEI) layer on the negative electrode by continuously supplying a material (additive) capable of forming and restoring the solid electrolyte interface (SEI) layer even during operation of the lithium-sulfur secondary battery at a constant level, and a method for preparing the same.

It is another object of the present disclosure to provide a lithium-sulfur secondary battery including the capsule.

In order to achieve the above objects, the present disclosure provides a capsule for a lithium-sulfur secondary battery, which comprises a core containing a hydrogel and a material capable of forming and restoring a solid electrolyte interface (SEI) layer, and a shell formed of a polymer and surrounding the core.

In addition, the present disclosure provides a capsule for a lithium-sulfur secondary battery, wherein the material capable of forming and restoring the solid electrolyte interface (SEI) layer is at least one selected from the group consisting of $LiNO_3$, $Be(NO_3)_2$, $NaNO_3$, $Mg(NO_3)_2$, Al(NO$_3$)$_3$, KNO$_3$, Ca(NO$_3$)$_2$, Sc(NO$_3$)$_3$, Ti(NO$_3$)$_4$, VO(NO$_3$)$_3$, Cr(NO$_3$)$_3$, Mn(NO$_3$)$_2$, Fe(NO$_3$)$_3$, Fe(NO$_3$)$_2$, Co(NO$_3$)$_2$, Co(NO$_3$)$_3$, Ni(NO$_3$)$_2$, Cu(NO$_3$)$_2$, Zn(NO$_3$)$_2$, Ga(NO$_3$)$_3$, RbNO$_3$, Sr(NO$_3$)$_2$, Y(NO$_3$)$_3$, Zr(NO$_3$)$_4$, Pd(NO$_3$)$_2$, AgNO$_3$, Cd(NO$_3$)$_2$, Sb(NO$_3$)$_3$, Xe(NO$_3$)$_2$, CsNO$_3$, Ba(NO$_3$)$_2$, Hg$_2$(NO$_3$)$_2$, Hg(NO$_3$)$_2$, Tl(NO$_3$)$_3$, TlNO$_3$, Pb(NO$_3$)$_2$, Bi(NO$_3$)$_3$, BiO(NO$_3$), FrNO$_3$, Ra(NO$_3$)$_2$, La(NO$_3$)$_3$, Ce(NO$_3$)$_3$, Ce(NO$_3$)$_4$, Nd(NO$_3$)$_3$, Eu(NO$_3$)$_3$, Gd(NO$_3$)$_3$, and Tb(NO$_3$)$_3$.

In addition, the present disclosure provides a capsule for a lithium-sulfur secondary battery, wherein the hydrogel is selected from the group consisting of acrylate-based polymers, polysaccharides, poly amino acids, and combinations thereof, and the acrylate-based polymer comprises a monomer-derived unit having two or more acrylate groups and an ethylene glycol group.

In addition, the present disclosure provides a capsule for a lithium-sulfur secondary battery, wherein the polymer is formed by crosslinking an epoxy compound having two or more epoxy groups and a crosslinking agent having two or more amino groups.

In addition, the present disclosure provides a capsule for a lithium-sulfur secondary battery, wherein the epoxy compound having two or more epoxy groups is at least one selected from the group consisting of 1,4-butanediol diglycidyl ether (BDDE), ethylene glycol diglycidyl ether (EGDGE), 1,6-hexanediol diglycidyl ether, propylene glycol diglycidyl ether, poly(propylene glycol)diglycidyl ether, poly(tetramethylene glycol)diglycidyl ether, neopentyl glycol diglycidyl ether, trimethylolpropane triglycidyl ether, polyglycerol polyglycidyl ether, diglycerol polyglycidyl ether, glycerol polyglycidyl ether, trimethylolpropane polyglycidyl ether, 1,2-(bis(2,3-epoxypropoxy)ethylene, pentaerythritol polyglycidyl ether and sorbitol polyglycidyl ether.

In addition, the present disclosure provides a capsule for a lithium-sulfur secondary battery, wherein the crosslinking agent having two or more amino groups is at least one selected from the group consisting of ethylene diamine, diethylene triamine, dipropylene triamine, triethylene tetramine, tetraethylene pentaamine, 1,3-diamino propane, 1,4-diamino butane, 1,6-diamino hexane, 1,8-diamino octane, 1,10-diamino decane, 1,12-diamino dodecane, isophoronediamine, 1,2-cyclohexane diamine, piperazine, 2,5-diamino pyridine, 4,4'-diamino dicyclohexyl methane, 4,4'-diamino-3,3'-dimethyldiphenylmethane, 1,3-bis(aminoethyl)cyclohexane, xylylene diamine, methaphenylene diamine and diamino diphenyl methane.

In addition, the present disclosure provides a capsule for a lithium-sulfur secondary battery, wherein the capsule for the lithium-sulfur secondary battery has a particle diameter of 0.1 to 5.0 μm.

In addition, the present disclosure provides a capsule for a lithium-sulfur secondary battery, wherein the content of the material capable of forming and restoring the solid electrolyte interface layer is 10% by weight to 70% by weight based on the total weight of the capsule for the lithium-sulfur secondary battery.

In addition, the present disclosure provides a lithium-sulfur secondary battery comprising the capsule for the lithium-sulfur secondary battery, a positive electrode, a negative electrode, a separator, and an electrolyte solution.

In addition, the present disclosure provides a lithium-sulfur secondary battery further comprising a separate material capable of forming and restoring the solid electrolyte interface layer.

In addition, the present disclosure provides a lithium-sulfur secondary battery, wherein the content of the capsule for the lithium-sulfur secondary battery is 0.1% by weight to 6.0% by weight based on the total weight of the electrolyte solution.

In addition, the present disclosure provides a lithium-sulfur secondary battery, wherein the total amount of the material capable of forming and restoring the solid electrolyte interface layer included in the capsule for the lithium-sulfur secondary battery and the additionally included material capable of forming and restoring the solid electrolyte interface layer is 0.1% by weight to 10% by weight based on the total weight of the electrolyte solution.

In addition, the present disclosure provides a method for preparing the capsule for the lithium-sulfur secondary battery comprising the steps of dissolving a material capable of forming and restoring the solid electrolyte interface (SEI) layer, a monomer capable of forming a hydrogel, and a crosslinking agent having two or more amino groups in water to prepare an aqueous phase portion; preparing a water-in-oil emulsion solution by mixing the aqueous phase portion with an oil phase portion containing an oil phase component and a surfactant; adding an epoxy compound having two or more epoxy groups to the emulsion solution to form a shell; forming a hydrogel core using radical polymerization; and removing the oil phase component from the emulsion solution and drying the resulting product.

In addition, the present disclosure provides a method for preparing the capsule for the lithium-sulfur secondary battery, wherein the hydrogel is selected from the group consisting of acrylate-based polymers, polysaccharides, poly amino acids, and combinations thereof, and the acrylate-based polymer comprises a monomer-derived unit having two or more acrylate groups and an ethylene glycol group.

In addition, the present disclosure provides a method for preparing the capsule for the lithium-sulfur secondary battery, wherein the surfactant has a hydrophilic/lipophilic balance (HLB) value of 1 to 6.

The capsule for lithium-sulfur secondary battery according to the present disclosure exhibits the effect of maintaining the solid electrolyte interface (SEI) layer on the negative electrode for a long time, by comprising a core containing a material capable of forming and restoring the solid electrolyte interface (SEI) layer and a hydrogel, and a shell formed of a polymer and surrounding the core, and thus maintaining the material capable of forming and restoring the solid electrolyte interface (SEI) layer at a constant level during operation of the battery.

In addition, by using the capsule for lithium-sulfur secondary battery according to the present disclosure, the present disclosure exhibits the effect of suppressing the abrupt decrease in the efficiency of the battery and the decrease in the discharging capacity of the battery by preventing damage to the solid electrolyte interface (SEI) layer on the negative electrode even during operation of the lithium-sulfur secondary battery and thus preventing the lithium metal from being exposed to the electrolyte solution. That is, the present disclosure exhibits an effect of improving the lifetime characteristics of a lithium-sulfur secondary battery.

DETAILED DESCRIPTION

The embodiments provided according to the present disclosure can all be achieved by the following description. It is to be understood that the following description describes preferred embodiments of the present disclosure and the present disclosure is not necessarily limited thereto.

The present disclosure provides a capsule for a lithium-sulfur secondary battery, which comprises a core containing a material capable of forming and restoring the solid electrolyte interface (SEI) layer and a hydrogel, and a shell formed of a polymer and surrounding the core.

The material capable of forming and restoring the solid electrolyte interface (SEI) layer may be at least one selected from the group consisting of $LiNO_3$, $Be(NO_3)_2$, $NaNO_3$, $Mg(NO_3)_2$, $Al(NO_3)_3$, $KNO_3$, $Ca(NO_3)_2$, $Sc(NO_3)_3$, $Ti(NO_3)_4$, $VO(NO_3)_3$, $Cr(NO_3)_3$, $Mn(NO_3)_2$, $Fe(NO_3)_3$, $Fe(NO_3)_2$, $Co(NO_3)_2$, $Co(NO_3)_3$, $Ni(NO_3)_2$, $Cu(NO_3)_2$, $Zn(NO_3)_2$, $Ga(NO_3)_3$, $RbNO_3$, $Sr(NO_3)_2$, $Y(NO_3)_3$, $Zr(NO_3)_4$, $Pd(NO_3)_2$, $AgNO_3$, $Cd(NO_3)_2$, $Sb(NO_3)_3$, $Xe(NO_3)_2$, $CsNO_3$, $Ba(NO_3)_2$, $Hg_2(NO_3)_2$, $Hg(NO_3)_2$, $Tl(NO_3)_3$, $TlNO_3$, $Pb(NO_3)_2$, $Bi(NO_3)_3$, $BiO(NO_3)$, $FrNO_3$, $Ra(NO_3)_2$, $La(NO_3)_3$, $Ce(NO_3)_3$, $Ce(NO_3)_4$, $Nd(NO_3)_3$, $Eu(NO_3)_3$, $Gd(NO_3)_3$, and $Tb(NO_3)_3$, and preferably may be lithium nitrate ($LiNO_3$).

In addition, the hydrogel may be selected from the group consisting of acrylate-based polymers, polysaccharides, poly amino acids, and combinations thereof, and preferably selected from the group consisting of acrylate-based polymers, hyaluronic acid, gelatin, and combinations thereof. The acrylate-based polymer may include a monomer-derived unit having two or more acrylate groups and an ethylene glycol group. In addition, the number average molecular weight of the monomer having two or more acrylate groups and an ethylene glycol group may be 500 to 1000, preferably 550 to 800, more preferably 575 to 700. If the number average molecular weight of the monomer having two or more acrylate groups and an ethylene glycol group is less than the above range, the solubility in water is too low so that the monomer is difficult to exist in the aqueous phase portion and thus it is difficult to form a hydrogel in the capsule. If the number average molecular weight of the monomer having two or more acrylate groups and an ethylene glycol group exceeds the above range, the number of acrylate groups per weight of the monomer is reduced and thus the leaching tends to be faster while the degree of crosslinking of the capsule is decreased. Therefore, it is preferable that the number average molecular weight of the monomer having two or more acrylate groups and an ethylene glycol group satisfies the above range.

The hydrogel may be formed by radical polymerization of a monomer having two or more acrylate groups and an ethylene glycol group using radical initiation, and the hydrogel formed as described above can prevent the material capable of forming and restoring the solid electrolyte interface layer contained in the core from being leached into the electrolyte solution at once, and can be swollen in the electrolyte solution so that the material capable of forming and restoring the solid electrolyte interface layer can be slowly leached into the electrolyte solution.

In addition, the polymer may be formed by crosslinking an epoxy compound having two or more epoxy groups and a crosslinking agent having two or more amino groups.

Specifically, the shell formed of a polymer and surrounding the core may be formed by crosslinking an epoxy compound having two or more epoxy groups on the surface of the aqueous phase portion including the crosslinking agent having two or more amino groups. The shell formed as described above can prevent the material capable of forming and restoring the solid electrolyte interface layer contained in the core from being leached into the electrolyte solution at once, and the shell can be swollen in the electrolyte solution so that the material capable of forming and restoring the solid electrolyte interface layer contained in the core can be slowly leached into the electrolyte solution.

As a result, as the material capable of forming and restoring the solid electrolyte interface (SEI) layer is slowly leached into the electrolyte solution, it is possible to maintain the solid electrolyte interface (SEI) layer on the negative electrode for a long time.

In addition, the epoxy compound having two or more epoxy groups may be at least one selected from the group consisting of 1,4-butanediol diglycidyl ether (BDDE), ethylene glycol diglycidyl ether (EGDGE), 1,6-hexanediol diglycidyl ether, propylene glycol diglycidyl ether, poly(propylene glycol)diglycidyl ether, poly(tetramethylene glycol)diglycidyl ether, neopentyl glycol diglycidyl ether, trimethylolpropane triglycidyl ether, polyglycerol polyglycidyl ether, diglycerol polyglycidyl ether, glycerol polyglycidyl ether, trimethylolpropane polyglycidyl ether, 1,2-(bis(2,3-epoxypropoxy)ethylene, pentaerythritol polyglycidyl ether and sorbitol polyglycidyl ether, and preferably may be 1,4-butanediol diglycidyl ether (BDDE).

In addition, the crosslinking agent having two or more amino groups may be at least one selected from the group consisting of ethylene diamine, diethylene triamine, dipropylene triamine, triethylene tetramine, tetraethylene pentaamine, 1,3-diamino propane, 1,4-diamino butane, 1,6-diamino hexane, 1,8-diamino octane, 1,10-diamino decane, 1,12-diamino dodecane, isophoronediamine, 1,2-cyclohexane diamine, piperazine, 2,5-diamino pyridine, 4,4'-diamino dicyclohexyl methane, 4,4'-diamino-3,3'-dimethyldiphenylmethane, 1,3-bis(aminoethyl)cyclohexane, xylylene diamine, methaphenylene diamine and diamino diphenyl methane, and preferably may be dipropylene triamine.

The particle diameter of the capsule for the lithium-sulfur secondary battery may be 0.1 to 5.0 μm, preferably 0.3 to 3.0 μm, and more preferably 0.35 to 2.5 μm. If the particle size of the capsule for the lithium-sulfur secondary battery is less than the above range, it is difficult to sufficiently leach the material capable of forming and restoring the solid electrolyte interface (SEI) layer contained in the core. If the particle size of the capsule for the lithium-sulfur secondary battery exceeds the above range, the material capable of forming and restoring the solid electrolyte interface (SEI) layer contained in the core may be leached excessively at one time. Therefore, it is preferable that the particle diameter of the capsule for the lithium-sulfur secondary battery satisfies the above range.

In the capsule for the lithium-sulfur secondary battery, the content of the material capable of forming and restoring the solid electrolyte interface layer may be may be 10% by weight to 70% by weight, preferably 30% by weight to 60% by weight, more preferably 40% by weight to 50% by weight based on the total weight of the capsule for the lithium-sulfur secondary battery. If the content of the material capable of forming and restoring the solid electrolyte interface layer is less than the above range, it is difficult to sufficiently leach the material capable of forming and restoring the solid electrolyte interface layer contained in the core. If the content of the material capable of forming and restoring the solid electrolyte interface layer exceeds the above range, since the shell does not sufficiently cover the core, the material capable of forming and restoring the solid electrolyte interface layer contained in the core may be leached excessively at one time. Therefore, it is preferable that the content of the material capable of forming and restoring the solid electrolyte interface layer satisfies the above range.

In addition, the present disclosure provides a method for preparing the capsule for the lithium-sulfur secondary battery comprising the steps of dissolving a material capable of forming and restoring the solid electrolyte interface (SEI) layer, a monomer capable of forming a hydrogel, and a crosslinking agent having two or more amino groups in water to prepare an aqueous phase portion; preparing a water-in-oil emulsion solution by mixing the aqueous phase portion with an oil phase portion containing an oil phase component and a surfactant; adding an epoxy compound having two or more epoxy groups to the emulsion solution to form a shell; forming a hydrogel core using radical polymerization; and removing the oil phase component from the emulsion solution and drying the resulting product.

In the step of preparing the aqueous phase portion, a radical initiator may be further comprised.

The radical initiator may be a water-soluble radical initiator, and the water-soluble radical initiator may be a water-soluble azo-based radical initiator having a 10-hour half-life temperature of 40 to 70° C. Specifically, the water-soluble azo-based radical initiator may be an azo amidine-based initiator (V-057, V-50 (Wako Chemical)), an azo nitrile-based initiator (VA-501 (Wako Chemical)), and the like, but is not limited thereto. In addition, as the water-soluble radical initiator, ammonium persulfate, potassium persulfate, sodium persulfate, etc. may be used alone, or used together with a reducing agent such as sodium bisulfate and sodium formaldehyde sulfoxylate, but is not limited thereto.

The radical initiator may form a hydrogel by radical polymerization of monomers having two or more acrylate groups and an ethylene glycol group in the step of forming the hydrogel core.

The material capable of forming and restoring the solid electrolyte interface (SEI) layer may be at least one selected from the group consisting of $LiNO_3$, $Be(NO_3)_2$, $NaNO_3$, $Mg(NO_3)_2$, $Al(NO_3)_3$, $KNO_3$, $Ca(NO_3)_2$, $Sc(NO_3)_3$, $Ti(NO_3)_4$, $VO(NO_3)_3$, $Cr(NO_3)_3$, $Mn(NO_3)_2$, $Fe(NO_3)_3$, $Fe(NO_3)_2$, $Co(NO_3)_2$, $Co(NO_3)_3$, $Ni(NO_3)_2$, $Cu(NO_3)_2$, $Zn(NO_3)_2$, $Ga(NO_3)_3$, $RbNO_3$, $Sr(NO_3)_2$, $Y(NO_3)_3$, $Zr(NO_3)_4$, $Pd(NO_3)_2$, $AgNO_3$, $Cd(NO_3)_2$, $Sb(NO_3)_3$, $Xe(NO_3)_2$, $CsNO_3$, $Ba(NO_3)_2$, $Hg_2(NO_3)_2$, $Hg(NO_3)_2$, $Tl(NO_3)_3$, $TlNO_3$, $Pb(NO_3)_2$, $Bi(NO_3)_3$, $BiO(NO_3)$, $FrNO_3$, $Ra(NO_3)_2$, $La(NO_3)_3$, $Ce(NO_3)_3$, $Ce(NO_3)_4$, $Nd(NO_3)_3$, $Eu(NO_3)_3$, $Gd(NO_3)_3$ and $Tb(NO_3)_3$, and preferably may be lithium nitrate ($LiNO_3$).

In addition, the epoxy compound having two or more epoxy groups may be at least one selected from the group consisting of 1,4-butanediol diglycidyl ether (BDDE), ethylene glycol diglycidyl ether (EGDGE), 1,6-hexanediol diglycidyl ether, propylene glycol diglycidyl ether, poly(propylene glycol)diglycidyl ether, poly(tetramethylene glycol)diglycidyl ether, neopentyl glycol diglycidyl ether, trimethylolpropane triglycidyl ether, polyglycerol polyglycidyl ether, diglycerol polyglycidyl ether, glycerol polyglycidyl ether, trimethylolpropane polyglycidyl ether, 1,2-(bis(2,3-epoxypropoxy)ethylene, pentaerythritol polyglycidyl ether and sorbitol polyglycidyl ether, and preferably may be 1,4-butanediol diglycidyl ether (BDDE).

In addition, the crosslinking agent having two or more amino groups may be at least one selected from the group consisting of ethylene diamine, diethylene triamine, dipropylene triamine, triethylene tetramine, tetraethylene pentaamine, 1,3-diamino propane, 1,4-diamino butane, 1,6-diamino hexane, 1,8-diamino octane, 1,10-diamino decane, 1,12-diamino dodecane, isophoronediamine, 1,2-cyclohexane diamine, piperazine, 2,5-diamino pyridine, 4,4'-diamino dicyclohexyl methane, 4,4'-diamino-3,3'-dimethyldiphenylmethane, 1,3-bis(aminoethyl)cyclohexane, xylylene diamine, methaphenylene diamine and diamino diphenyl methane, and preferably may be dipropylene triamine.

In addition, the oil phase component may be at least one selected from decane, hexane, pentane, cyclopentane, benzene, toluene, o-xylene, m-xylene, p-xylene, diethyl ether, methylethylketone, dichloromethane, tetrahydrofuran, mineral oil, paraffin oil, and plant-derived oil, and preferably may be paraffin oil.

In addition, the surfactant may have a hydrophilic/lipophilic balance (HLB) value of 1 to 6, preferably 3 to 5. Specific examples of surfactant may be, but are not limited to, at least one selected from the group consisting of SPAN120, SPAN83, SPAN85, SPAN80, SPAN60, SPAN40, Brij52, Brij72, Brij93, Triton X35 and Triton X15.

In addition, the particle diameter of the capsule for the lithium-sulfur secondary battery prepared by the above method may be 0.1 to 5.0 μm, preferably 0.3 to 3.0 μm, and more preferably 0.35 to 2.5 μm. If the particle size of the capsule for the lithium-sulfur secondary battery is less than the above range, it is difficult to sufficiently leach the material capable of forming and restoring the solid electrolyte interface (SEI) layer contained in the core. If the particle size of the capsule for the lithium-sulfur secondary battery exceeds the above range, the material capable of forming and restoring the solid electrolyte interface (SEI) layer contained in the core may be leached excessively at one time. Therefore, it is preferable that the particle diameter of the capsule for the lithium-sulfur secondary battery satisfies the above range.

In addition, in the capsule for the lithium-sulfur secondary battery prepared by the above preparation method, the content of the material capable of forming and restoring the solid electrolyte interface layer may be may be 10% by weight to 70% by weight, preferably 30% by weight to 60% by weight, more preferably 40% by weight to 50% by weight based on the total weight of the capsule for the lithium-sulfur secondary battery. If the content of the material capable of forming and restoring the solid electrolyte interface layer is less than the above range, it is difficult to sufficiently leach the material capable of forming and restoring the solid electrolyte interface (SEI) layer contained in the core. If the content of the material capable of forming and restoring the solid electrolyte interface layer exceeds the above range, since the shell does not sufficiently cover the core, the material capable of forming and restoring the solid electrolyte interface (SEI) layer contained in the core may be leached excessively at one time. Therefore, it is preferable that the content of the material capable of forming and restoring the solid electrolyte interface layer satisfies the above range.

In addition, the present disclosure provides a lithium-sulfur secondary battery comprising the above-described capsule for the lithium-sulfur secondary battery, a positive electrode, a negative electrode, a separator, and an electrolyte solution, and the lithium-sulfur secondary battery additionally comprises the material capable of forming and restoring the solid electrolyte interface layer.

In addition, the content of the capsule for the lithium-sulfur secondary battery comprised in the lithium-sulfur secondary battery may be 0.1% by weight to 6.0% by weight, preferably 0.5% by weight to 3.0% by weight, based on the total weight of the electrolyte solution. If the content of the capsule for the lithium-sulfur secondary battery is out of the above range, the discharging capacity, average voltage, and lifetime characteristics of the lithium-sulfur secondary battery may be deteriorated, and it is difficult to obtain an effect of improving battery performance. Therefore, it is preferable that the content of the capsule for the lithium-sulfur secondary battery satisfies the above range.

In addition, the total amount of the material capable of forming and restoring the solid electrolyte interface layer included in the capsule for the lithium-sulfur secondary battery and the additionally included material capable of forming and restoring the solid electrolyte interface layer may be 0.1% by weight to 10% by weight, preferably 0.2% by weight to 8% by weight, and more preferably 0.5% by weight to 7% by weight, based on the total weight of the electrolyte solution. If the total amount of the material capable of forming and restoring the solid electrolyte interface layer is less than the above range, it is not possible to sufficiently inhibit the damage of the solid electrolyte interface layer. If the total amount of the material capable of forming and restoring the solid electrolyte interface exceeds the above range, it may act as a resistor in the battery to lower the energy density and shorten the lifetime. Therefore, it is preferable that the total amount of the material capable of forming and restoring the solid electrolyte interface layer satisfies the above range.

In addition, the present disclosure can also provide a battery module comprising the lithium-sulfur secondary battery as a unit cell and a battery pack including the same. The battery module or the battery pack may be used as a power source for any one or more medium and large-sized devices of a power tool; an electric vehicle including an electric vehicle (EV), a hybrid electric vehicle, and a plug-in hybrid electric vehicle (PHEV); or a power storage system, etc.

In addition, the capsule for the lithium-sulfur secondary battery may be comprised in any one or more of a positive electrode, a negative electrode, a separator, and an electrolyte solution, and preferably may be comprised in an electrolyte solution.

As the capsule for the lithium-sulfur secondary battery is contained in the electrolyte solution, the material capable of forming and restoring the solid electrolyte interface (SEI) layer contained in the core is leached into the electrolyte solution during operation of the battery and maintained at a constant concentration in the electrolyte solution, so that the solid electrolyte interface (SEI) layer on the negative electrode can be maintained at a constant level.

Hereinafter, a description of the positive electrode, the negative electrode and the electrolyte applied to the lithium-sulfur secondary battery according to the present disclosure is added.

Positive Electrode

The positive electrode used in the present disclosure will be described below. After preparing a composition for the positive electrode containing the positive electrode active material, the electrically conductive material, and the binder, the slurry prepared by diluting such a composition in a predetermined solvent (disperse medium) can be directly coated and dried on a positive electrode current collector to form a positive electrode layer. Alternatively, after casting the slurry on a separate support, a film obtained by peeling from the support can be laminated on a positive electrode current collector to produce a positive electrode layer. In addition, the positive electrode can be manufactured in a variety of ways using methods well known to those skilled in the art.

The electrically conductive material not only serves as a path for electrons to move from the positive electrode current collector to the positive electrode active material, thereby imparting electronic conductivity, but also electrically connects the electrolyte solution and the positive electrode active material, thereby simultaneously serving as a path for lithium ions (Li+) in the electrolyte solution to move to and react with sulfur. Therefore, if the amount of the electrically conductive material is insufficient or the electrically conductive material does not perform properly, the non-reacting portion of sulfur in the electrode is increased and eventually the reduction of capacity is caused. Also, the high rate discharging characteristics and the charging/discharging cycle lifetime are adversely affected. Therefore, it is necessary to add an appropriate amount of the electrically conductive material. The electrically conductive material is preferably added in an amount of 0.01 to 30% by weight based on the total weight of the composition for the positive electrode.

The electrically conductive material is not particularly limited as long as it has electrical conductivity without causing chemical changes in the battery, and for example, graphite; carbon blacks such as Denka black, acetylene black, Ketjen black, channel black, furnace black, lamp black, and thermal black; electrically conductive fibers such as carbon fibers and metal fibers; carbon fluoride; metal powders such as aluminum, and nickel powder; electrically conductive whiskers such as zinc oxide and potassium titanate; electrically conductive metal oxides such as titanium oxide; electrically conductive materials such as polyphenylene derivatives and the like can be used. Specific examples of commercially available and electrically conductive materials may comprise acetylene black series of products from Chevron Chemical Company or Denka black (Denka Singapore Private Limited), products from Gulf Oil Company, Ketjen black, EC series of products from Armak Company, products of Vulcan XC-72 from Cabot Company and Super P (products from Timcal Company).

The binder is for attaching the positive electrode active material to the current collector well. The binder should be well dissolved in the solvent, and should not only constitute the conductive network between the positive electrode active material and the electrically conductive material, but also have a proper impregnation property into the electrolyte solution. The binder may be any binder known in the art, and specifically may be, but is not limited thereto, any one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropylcellulose, and regenerated cellulose; polyalcohol-based binders; polyolefin-based binders including polyethylene and polypropylene; polyimide-based binders, polyester-based binders, silane-based binders and mixtures or copolymers of two or more thereof.

The content of the binder may be, but is not limited to, 0.5 to 30 wt. % based on the total weight of the composition for the positive electrode. If the content of the binder resin is less than 0.5 wt. %, the physical properties of the positive electrode may be deteriorated and thus positive electrode active material and the electrically conductive material can be broken away. If the content exceeds 30 wt. %, the ratio of the active material and the electrically conductive material in the positive electrode is relatively reduced and thus the battery capacity can be reduced and the content can act as a resistive element, reducing efficiency.

The composition for the positive electrode comprising the positive electrode active material, the electrically conductive material, and the binder may be diluted in a predetermined solvent and coated on a positive electrode current collector using a conventional method known in the art. First, a positive electrode current collector is prepared. The positive electrode current collector generally has a thickness of 3 to 500 μm. The positive electrode current collector is not particularly limited as long as it has a high electrical conductivity without causing chemical changes in the battery, and for example, may be stainless steel, aluminum, nickel, titanium, sintered carbon, or aluminum or stainless steel surface-treated with carbon, nickel, titanium, silver, or the like. The current collector can also increase the adhesive force of the positive electrode active material by forming fine irregularities on its surface and can be in various forms such as film, sheet, foil, net, porous body, foam, and nonwoven fabric.

Next, a slurry obtained by diluting the composition for the positive electrode containing the positive electrode active material, the electrically conductive material, and the binder in a solvent is applied to the positive electrode current collector. The composition for the positive electrode containing the above-described positive electrode active material, electrically conductive material, and binder may be mixed with a predetermined solvent to prepare the slurry. At this time, the solvent should be easy to dry, and it is most preferable to be able to dissolve the binder well, but to keep the positive electrode active material and the electrically conductive material in a dispersed state without dissolving. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems in the electrically conductive network, thereby causing problems with regard to the operation of the battery. The solvent (disperse medium) may be water or an organic solvent. The organic solvent may be at least one selected from the group consisting of dimethylformamide, isopropyl alcohol, acetonitrile, methanol, ethanol and tetrahydrofuran.

Subsequently, there is no particular limitation on the method of applying the composition for the positive electrode in the slurry state. For example, a coating layer may be prepared by a doctor blade coating method, a dip coating method, a gravure coating method, a slit die coating method, a spin coating method, a comma coating method, a bar coating method, a reverse roll coating method, a screen coating method, and a cap coating method, etc. Thereafter, in the composition for the positive electrode that has undergone such a coating process, evaporation of the solvent (disperse medium), compaction of the coating film and adhesion between the coating film and the current collector is achieved through a drying process. At this time, drying is performed according to a conventional method, and is not particularly limited.

Negative Electrode

As the negative electrode, any one capable of intercalation and deintercalation of lithium ions can be used. For example, metal materials such as lithium metal and lithium alloy, and carbon materials such as low crystalline carbon and high crystalline carbon can be exemplified. As the low crystalline carbon, soft carbon and hard carbon are typical. As the high crystalline carbon, high temperature sintered carbon such as natural graphite, Kish graphite, pyrolytic carbon, mesophase pitch based carbon fiber, meso-carbon microbeads, mesophase pitches and petroleum or coal tar pitch derived cokes are typical. In addition, alloy series containing silicon, oxides such as $Li_4Ti_6O_{18}$ or the like are also well-known negative electrodes.

In this case, the negative electrode may comprise a binder. The binder may be various kinds of binder polymers such as polyvinylidenefluoride, polyvinylidenefluoride-hexafluoropropylene copolymer, polyacrylonitrile, polymethylmethacrylate, and styrene-butadiene rubber.

The negative electrode may optionally further comprise a negative electrode current collector for supporting the negative electrode active layer containing the negative electrode active material and the binder. The negative electrode current collector may be specifically selected from the group consisting of copper, stainless steel, titanium, silver, palladium, nickel, alloys thereof, and combinations thereof. The stainless steel may be surface-treated with carbon, nickel, titanium or silver, and an aluminum-cadmium alloy may be used as an alloy. In addition, a sintered carbon, a nonconductive polymer surface-treated with a conductive material, or a conductive polymer may be used.

The binder serves to paste the negative electrode active material, to bond the active materials to each other, to bond the active material and the current collector, to buffer the expansion and contraction of the active material and so on. Specifically, the binder is the same as described above for the binder of the positive electrode. Also, the negative electrode may be lithium metal or lithium alloy. The non-limiting examples of the negative electrode may be a thin film of lithium metal, and may be an alloy of lithium and at least one metal selected from the group consisting of Na, K, Rb, Cs, Fr, Be, Mg, Ca, Sr, Ba, Ra, Al and Sn.

Electrolyte Solution

The electrolyte solution comprises solvents and lithium salt, and if necessary, may further contain additives. The solvent can be used without particular limitation, as long as it is a conventional non-aqueous solvent that serves as a medium through which ions involved in the electrochemical reaction of the battery can move. Examples of the non-aqueous solvent may comprise carbonate-based solvents, ester-based solvents, ether-based solvents, ketone-based solvents, alcohol-based solvents, aprotic solvents and the like.

More specifically, examples of the carbonate-based solvent may comprise dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc. Examples of the ester-based solvent may specifically include methyl acetate, ethyl acetate, n-propyl acetate, 1,1-dimethyl ethyl acetate, methyl propionate, ethyl propionate, γ-butyrolactone, decanolide, valerolactone, and mevalonolactone, carprolactone, etc. Examples of the ether-based solvent may specifically include diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, and polyethylene glycol dimethyl ether, etc. In addition, examples of the ketone-based solvent may comprise cyclohexanone, etc. Examples of the alcohol-based solvent may comprise ethylalcohol, and isopropylalcohol, etc. Examples of the aprotic solvent may comprise nitriles such as acetonitrile, amides such as dimethylformamide, dioxolanes such as 1,3-dioxolane (DOL), and sulfolane, etc. The non-aqueous organic solvents may be used alone or in combination of two or more. The mixing ratio when using in combination of two or more may be appropriately adjusted depending on the desired performance of the battery, and a solvent in which 1,3-dioxolane and dimethoxyethane are mixed in a volume ratio of 1:1 can be exemplified.

Hereinafter, preferred examples will be described in order to facilitate understanding of the present disclosure. However, the following examples are provided to facilitate understanding of the present disclosure, but the present disclosure is not limited thereto.

Example 1

Preparation of Capsule for Lithium-Sulfur Secondary Battery 5.0 g of $LiNO_3$ as a material required for operation of the battery, 1.2 g of dipropylenetriamine as a crosslinking agent having two or more amino groups, 0.7 g of poly(ethylene glycol) diacrylate (Mn=575) as a monomer having two or more acrylate groups containing an ethylene glycol group and 0.007 g of V-50 (Wako Chemical) as a water-soluble radical initiator were dissolved in 6.7 mL of water to prepare an aqueous phase portion. The prepared aqueous phase portion was mixed with an oil phase portion containing 150 g of paraffin oil as an oil phase component and 7.5 g of SPAN80 as a surfactant and stirred at a high speed of 8000 rpm to prepare a water-in-oil emulsion solution. Then, after heating the emulsion solution to 50° C., 3.8 g of 1,4-butanediol diglycidyl ether as an epoxy compound having two or more epoxy groups was added, and an amine-epoxy crosslinking reaction was performed on the surface of the emulsion particles for 3 hours to form a shell. Then, after raising the temperature to 65° C. while purging with nitrogen, a hydrogel core was formed using radical polymerization. After the formation of the hydrogel core, the paraffinic oil of the upper layer was removed from the emulsion solution, the settled particles were recovered, and then washed 3 times with hexane to remove surfactant and residual paraffin oil. Thereafter, the particles were dried in air at room temperature and then vacuum dried at 80° C. for 12 hours to prepare capsules for the lithium-sulfur secondary battery.

Manufacture of Coin Cell

Example 2-1

A slurry of a positive electrode active material prepared by mixing 90% by weight of sulfur, 5% by weight of carbon black, and 5% by weight of polyethylene oxide with acetonitrile was coated on an aluminum current collector and dried to prepare a positive electrode. In addition, a lithium metal having a thickness of 50 μm was used as a negative electrode. The prepared positive electrode and the negative electrode were placed to face each other, and a polyethylene separator having a thickness of 20 μm was interposed therebetween, and then an electrolyte solution containing DOL/DME (1:1), $LiN(CF_3SO_2)_2$ (LiTFSI) 1M, $LiNO_3$ 3.5 wt. % and 1 wt. % of the prepared capsules for a lithium-sulfur secondary battery was charged to prepare a lithium-sulfur secondary battery in coin cell type.

Example 2-2

A lithium-sulfur secondary battery in coin cell type was manufactured in the same manner as in Example 2-1, except that 5.0 wt. % of $LiNO_3$ was contained in the electrolyte solution.

Comparative Example 2-1

A lithium-sulfur secondary battery in coin cell type was manufactured in the same manner as in Example 2-1, except that the capsules for the lithium-sulfur secondary battery were not contained.

Comparative Example 2-2

A lithium-sulfur secondary battery in coin cell type was manufactured in the same manner as in Example 2-2, except that the capsules for the lithium-sulfur secondary battery were not contained.

Comparative Example 2-3

A lithium-sulfur secondary battery in coin cell type was manufactured in the same manner as in Example 2-1, except that the capsules for the lithium-sulfur secondary battery were contained in an amount of 3 wt. %.

Comparative Example 2-4

A lithium-sulfur secondary battery in coin cell type was manufactured in the same manner as in Example 2-2, except that the capsules for the lithium-sulfur secondary battery were contained in an amount of 3 wt. %.

Experimental Example 1

Measurement of Initial Discharging Capacity of Lithium-Sulfur Secondary Battery in Coin Cell Type In order to evaluate the performance of the lithium-sulfur secondary batteries depending on the presence or absence and content of the capsules for the lithium-sulfur secondary battery of the present disclosure, the capacities of the lithium-sulfur secondary batteries prepared in Examples 2-1 and 2-2 and Comparative Examples 2-1 and 2-2, respectively, were measured from 1.8V to 2.5V at 25° C. using the charging/discharging measuring device.

Specifically, charging/discharging is performed at 0.1 C/0.1 C to measure the first discharging capacity (initial discharging capacity), and further, charging/discharging is performed three times at an initial 0.1 C/0.1 C, and then at 0.2 C/0.2 C to measure the fourth discharging capacity.

Figure 1:
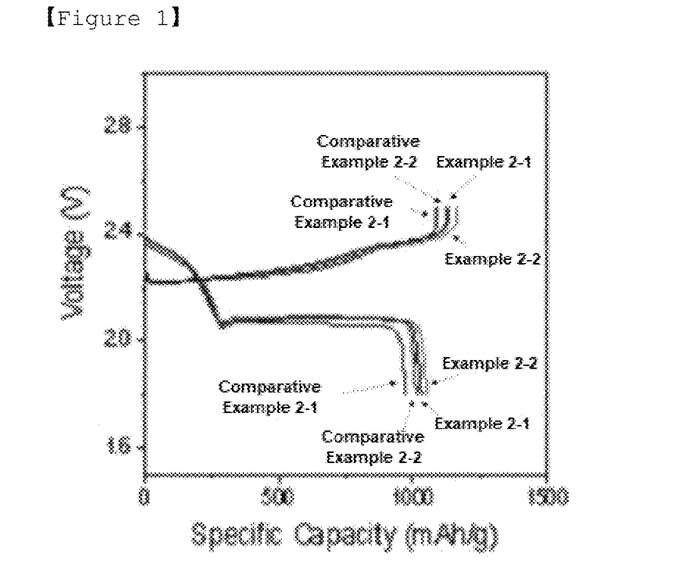
FIG. 1 is a graph showing the initial discharging capacity of lithium-sulfur secondary batteries in coin cell type according to Examples 2-1 and 2-2 and Comparative Examples 2-1 and 2-2.
Figure 2:
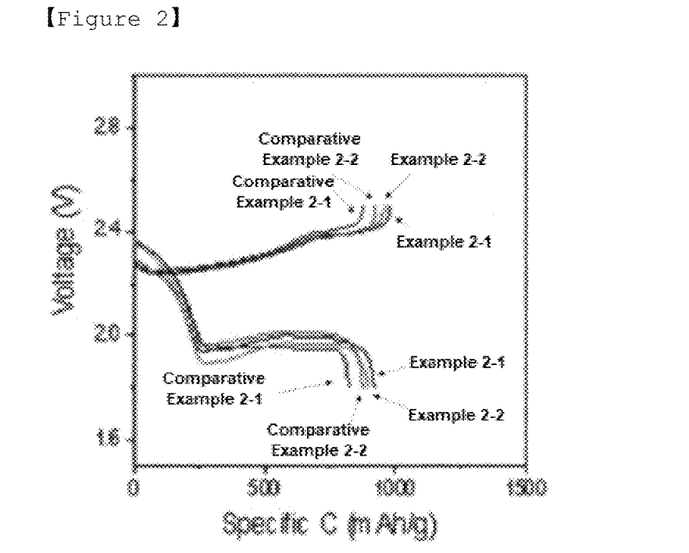
FIG. 2 is a graph showing the fourth discharge capacity of lithium-sulfur secondary batteries in coin cell type according to Examples 2-1 and 2-2 and Comparative Examples 2-1 and 2-2.

As a result, as shown in the graphs of FIGS. 1 and 2, it was confirmed that the lithium-sulfur secondary batteries of Examples 2-1 and 2-2 have higher discharging capacity and higher average voltage than those of Comparative Examples 2-1 and 2-2.

Experimental Example 2

Evaluation of Lifetime Characteristics of Lithium-Sulfur Secondary Battery in Coin Cell Type In order to evaluate the lifetime characteristics of the lithium-sulfur secondary batteries depending on the presence or absence of capsules for a lithium-sulfur secondary battery, the charging/discharging of the lithium-sulfur secondary batteries manufactured in Examples 2-1 to 2-2 and Comparative Examples 2-1 to 2-4, respectively were performed three times at a charge/discharge current rate of 0.1 C/0.1 C and three times at a charge/discharge current rate of 0.2 C/0.2 C, and then performed at a charge/discharge current rate of 0.3 C/0.5 C.

Figure 3:
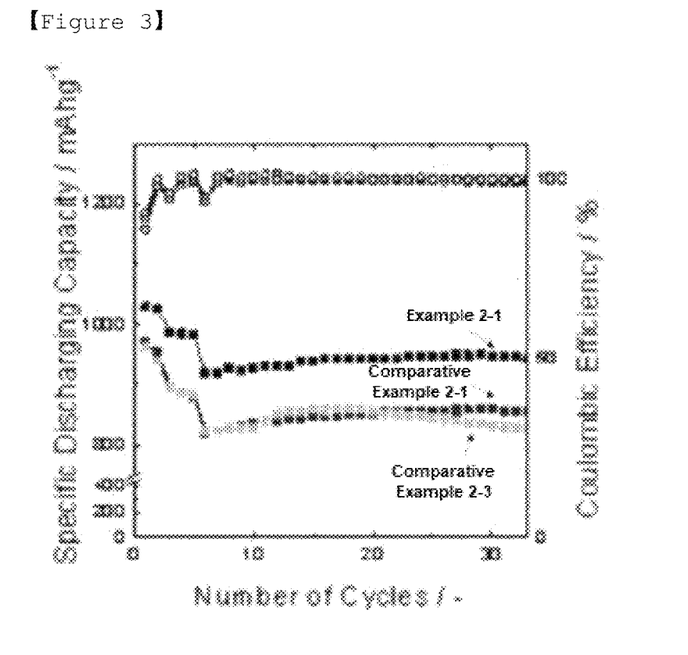
FIG. 3 is a graph showing the lifetime characteristics of lithium-sulfur secondary batteries in coin cell type according to Example 2-1 and Comparative Examples 2-1 and 2-3.
Figure 4:
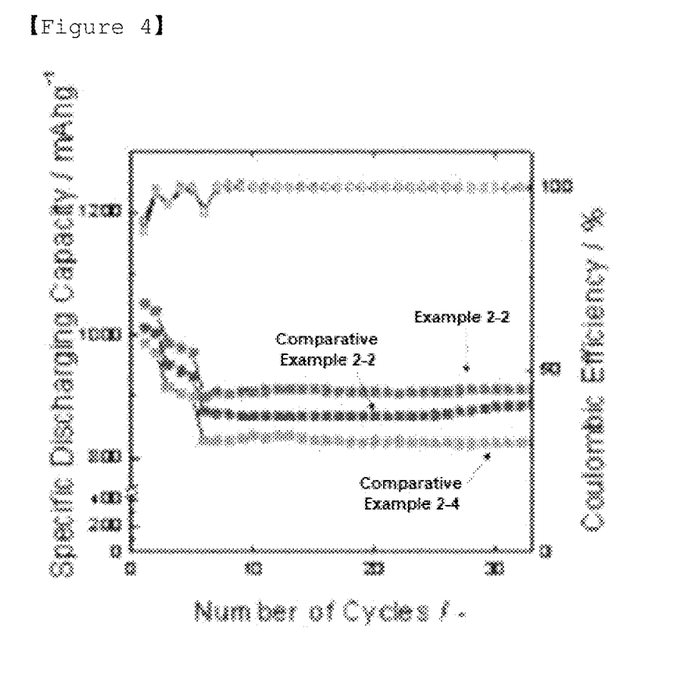
FIG. 4 is a graph showing the lifetime characteristics of lithium-sulfur secondary batteries of coin cell type according to Example 2-2, and Comparative Examples 2-2 and 2-4.

The results are as shown in FIGS. 3 and 4. That is, it was confirmed that the lithium-sulfur secondary batteries of Examples 2-1 and 2-2 containing capsules for the lithium-sulfur secondary battery according to the present disclosure in an amount of 1% by weight have superior lifetime characteristics compared to Comparative Examples 2-1 and 2-2 without capsules for the lithium-sulfur secondary battery, and Comparative Examples 2-3 and 2-4 containing capsules for the lithium-sulfur secondary battery in an amount of 3% by weight.

Experimental Example 3

Analysis of $LiNO_3$ Content in Capsules for Lithium-Sulfur Secondary Battery

The content of the additive ($LiNO_3$) in capsules for the lithium-sulfur secondary battery prepared in Example 1 was measured under an air flow of 60 ml/min at a heating rate of 5° C./min using a thermogravimetric analysis (Thermogravimetric Analysis, TA company, TGA Q500).

Figure 5:
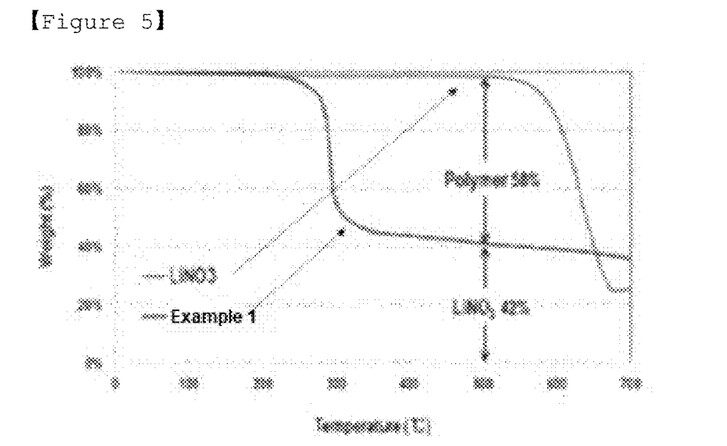
FIG. 5 is a graph showing thermogravimetric analysis of the capsule for the lithium-sulfur secondary battery according to Example 1.

As a result, as shown in FIG. 5, it was confirmed that in the capsules for the lithium-sulfur secondary battery according to Example 1, the polymer starts to decompose from 220° C. and the decomposition is completed at 400° C., so the polymer content in the capsule is 58% by weight and the $LiNO_3$ content is 42% by weight.

Experimental Example 4

Analysis of Shape and Size of Capsules for Lithium-Sulfur Secondary Battery

The shape and particle size of the capsules for the lithium-sulfur secondary battery prepared in Example 1 and pure $LiNO_3$ (additive) were observed using SEM (Hitachi, S-4800).

Figure 6:
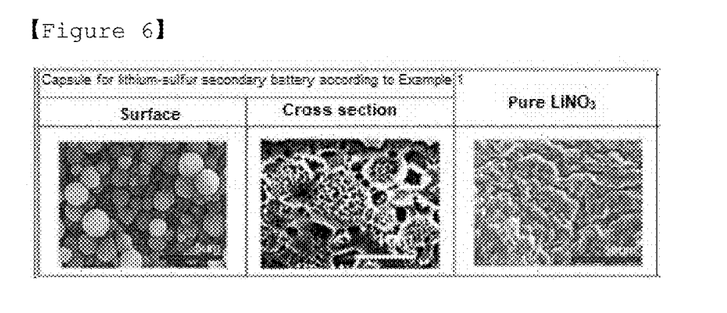
FIG. 6 is SEM images of the capsule for the lithium-sulfur secondary battery according to Example 1 and pure $LiNO_3$.

As a result, as shown in FIG. 6, it was confirmed that the capsules for the lithium-sulfur secondary battery in Example 1 were spherical particles with a size of 0.35~2.5 μm, unlike pure $LiNO_3$.

Experimental Example 5

Evaluation of Leaching Characteristics of Capsules for Lithium-Sulfur Secondary Battery In order to confirm the leaching characteristics of the capsule according to the present disclosure in the electrolyte solution, 1.0 g of the capsules for the lithium-sulfur secondary battery prepared in Example 1 was added to 50 g of solvent (DME, DOL), and then the upper solvent was collected on a 1 g by 1 g basis at room temperature over time, and the Li content in the electrolyte solution was analyzed by ICP-OES (Perkinelmer, Optima 8300W) analysis to calculate the leaching degree of the additive ($LiNO_3$).

As a result, as shown in Table 1, it was confirmed that in the case of the capsules for lithium-sulfur secondary battery according to the present disclosure, $LiNO_3$ is slowly leached into the electrolyte solution, as compared to when a pure additive ($LiNO_3$) is added. Specifically, it was confirmed that in the case of the capsules for lithium-sulfur secondary battery according to Example 1, unlike the case where the pure additive ($LiNO_3$) was added, only 60.5% and 39.8% of the additive ($LiNO_3$) contained in the original capsule are leached even after 21 days.

TABLE 1

| | | Leaching degree of additive (%) | | | | |
|---|---|---|---|---|---|---|
| | Solvent | 0 day | 3 days | 7 days | 14 days | 21 days |
| Pure $LiNO_3$ | DME | 100 | — | — | — | — |
| Capsule for lithium-sulfur secondary battery according to Example 1 | DME | 8.9 | 56.0 | 60.4 | 60.5 | 60.5 |
| | DOL | 2.8 | 22.9 | 35.2 | 38.5 | 39.8 |

All simple modifications and variations of the present disclosure fall within the scope of the present disclosure, and the specific protection scope of the present disclosure will be made clear by the appended claims.

The invention claimed is:

1. A capsule for a lithium-sulfur secondary battery, the capsule comprising:
    a core containing a material capable of forming and restoring a solid electrolyte interface layer and a hydrogel; and
    a shell formed of a polymer and surrounding the core.

2. The capsule according to claim 1, wherein the material capable of forming and restoring the solid electrolyte interface layer is at least one selected from the group consisting of $LiNO_3$, $Be(NO_3)_2$, $NaNO_3$, $Mg(NO_3)_2$, $Al(NO_3)_3$, $KNO_3$, $Ca(NO_3)_2$, $Sc(NO_3)_3$, $Ti(NO_3)_4$, $VO(NO_3)_3$, $Cr(NO_3)_3$, $Mn(NO_3)_2$, $Fe(NO_3)_3$, $Fe(NO_3)_2$, $Co(NO_3)_2$, $Co(NO_3)_3$, $Ni(NO_3)_2$, $Cu(NO_3)_2$, $Zn(NO_3)_2$, $Ga(NO_3)_3$, $RbNO_3$, $Sr(NO_3)_2$, $Y(NO_3)_3$, $Zr(NO_3)_4$, $Pd(NO_3)_2$, $AgNO_3$, $Cd(NO_3)_2$, $Sb(NO_3)_3$, $Xe(NO_3)_2$, $CsNO_3$, $Ba(NO_3)_2$, $Hg_2(NO_3)_2$, $Hg(NO_3)_2$, $Tl(NO_3)_3$, $TlNO_3$, $Pb(NO_3)_2$, $Bi(NO_3)_3$, $BiO(NO_3)$, $FrNO_3$, $Ra(NO_3)_2$, $La(NO_3)_3$, $Ce(NO_3)_3$, $Ce(NO_3)_4$, $Nd(NO_3)_3$, $Eu(NO_3)_3$, $Gd(NO_3)_3$, and $Tb(NO_3)_3$.

3. The capsule according to claim 1, wherein the hydrogel is selected from the group consisting of acrylate-based polymers, polysaccharides, poly amino acids, and combinations thereof, and the acrylate-based polymer includes a monomer-derived unit having two or more acrylate groups and an ethylene glycol group.

4. The capsule according to claim 1, wherein the polymer is formed by crosslinking an epoxy compound having two or more epoxy groups and a crosslinking agent having two or more amino groups.

5. The capsule according to claim 4, wherein the epoxy compound having two or more epoxy groups is at least one selected from the group consisting of 1,4-butanediol diglycidyl ether(BDDE), ethylene glycol diglycidyl ether (EGDGE), 1,6-hexanediol diglycidyl ether, propylene glycol diglycidyl ether, poly(propylene glycol) diglycidyl ether, poly(tetramethylene glycol)diglycidyl ether, neopentyl glycol diglycidyl ether, trimethylolpropane triglycidyl ether, polyglycerol polyglycidyl ether, diglycerol polyglycidyl ether, glycerol polyglycidyl ether, trimethylolpropane polyglycidyl ether, 1,2-(bis(2,3-epoxypropoxy)ethylene, pentaerythritol polyglycidyl ether, and sorbitol polyglycidyl ether.

6. The capsule according to claim 4, wherein the crosslinking agent having two or more amino groups is at least one selected from the group consisting of ethylene diamine, diethylene triamine, dipropylene triamine, triethylene tetramine, tetraethylene pentaamine, 1,3-diamino propane, 1,4-diamino butane, 1,6-diamino hexane, 1,8-diamino octane, 1,10-diamino decane, 1,12-diamino dodecane, isophoronediamine, 1,2-cyclohexane diamine, piperazine, 2,5-diamino pyridine, 4,4'-diamino dicyclohexyl methane, 4,4'-diamino-3,3'-dimethyldiphenylmethane, 1,3-bis (aminoethyl)cyclohexane, xylylene diamine, methaphenylene diamine, and diamino diphenyl methane.

7. The capsule according to claim 1, wherein the capsule has a particle diameter of 0.1 to 5.0 μm.

8. The capsule according to claim 1, wherein a content of the material capable of forming and restoring the solid electrolyte interface layer is 10% by weight to 70% by weight based on the total weight of the capsule.

9. A lithium-sulfur secondary battery comprising:
the capsule according to claim 1;
a positive electrode;
a negative electrode;
a separator; and
an electrolyte solution,
wherein the lithium-sulfur secondary battery additionally includes the material capable of forming and restoring the solid electrolyte interface layer.

10. The lithium-sulfur secondary battery according to claim 9, wherein a content of the capsule is 0.1% by weight to 6.0% by weight based on the total weight of the electrolyte solution.

11. The lithium-sulfur secondary battery according to claim 9, wherein the total amount of the material capable of forming and restoring the solid electrolyte interface layer included in the capsule and the additionally included material capable of forming and restoring the solid electrolyte interface layer is 0.1% by weight to 10% by weight, based on the total weight of the electrolyte solution.

12. A method for preparing a capsule for a lithium-sulfur secondary battery, the method comprising:
dissolving a material capable of forming and restoring a solid electrolyte interface layer, a monomer capable of forming a hydrogel, and a crosslinking agent having two or more amino groups in water to prepare an aqueous phase portion;
preparing a water-in-oil emulsion solution by mixing the aqueous phase portion with an oil phase portion containing an oil phase component and a surfactant;
adding an epoxy compound having two or more epoxy groups to the emulsion solution to form a shell;
forming a hydrogel core by radical polymerization; and
removing the oil phase component from the emulsion solution and drying the resulting product.

13. The method according to claim 12, wherein the hydrogel is selected from the group consisting of acrylate-based polymers, polysaccharides, poly amino acids, and combinations thereof, and the acrylate-based polymer includes a monomer-derived unit having two or more acrylate groups and an ethylene glycol group.

14. The method according to claim 12, wherein the surfactant has a hydrophilic/lipophilic balance value of 1 to 6.

* * * * *